United States Patent [19]
Clerk

[11] 3,932,991
[45] Jan. 20, 1976

[54] HYDROSTATIC TRANSMISSION CONTROL SYSTEM

[76] Inventor: Robert Cecil Clerk, Edison House, Fullerton Road, Queensway Industrial Estate, Glenrothes, Fife, Scotland

[22] Filed: July 23, 1974

[21] Appl. No.: 490,921

[30] Foreign Application Priority Data
July 23, 1973 United Kingdom............... 34908/73
July 18, 1974 United Kingdom............... 34908/74

[52] U.S. Cl. ...................... 60/431; 60/449; 60/490
[51] Int. Cl.² ........................................ F16H 39/46
[58] Field of Search ............ 60/423, 431, 448, 449, 60/490

[56] References Cited
UNITED STATES PATENTS
3,230,699   1/1966   Hann et al. ...................... 60/449 X
3,284,999   11/1966   Lease ............................... 60/449 X Primary Examiner—Edgar W. Geoghegan
Attorney, Agent, or Firm—Lerner, David, Littenberg & Samuel

[57] ABSTRACT

The application discloses a system which includes a prime mover driving a variable displacement type pump which in turn drives a variable displacement type motor all coordinated by a control system. Details of valves employed in the control system are disclosed as well as the overall interconnection of such valves with the engine, pump and motor. The control system controls the amount of fuel supplied to the engine, pump displacement, and motor displacement in such a manner as to achieve optimum performance.

1 Claim, 4 Drawing Figures

HYDROSTATIC TRANSMISSION CONTROL SYSTEM

This invention relates to control systems for vehicles characterized as having a controllable power prime mover driving through a variable hydrostatic transmission to the driven wheels of the vehicle.

It is well known on such vehicles for the operator to control the engine power by an accelerator pedal linked to the fuel control of the prime mover, and for separate manual and/or automatic control of the transmission to enable such transmission to achieve as nearly as possible the often conflicting requirements or demands of the operator, the prime mover characteristic and the vehicle/terrain conditions. Such automatic control of the transmission is known to be complex and costly if it is to achieve a reasonably effective and successful compromise of requirement and performance.

The object of the present invention is to provide a control system for such vehicles which will meet the requirements substantially without compromise and in fact will optimize the prime mover performance characteristics such that the prime mover will neither labour at low revolutions and unnecessarily high pressure loadings at the one extreme, nor will it run to unnecessary speeds beyond maximum power revolutions, yet in between these extremes it will be held to the minimum convenient revolutions at which it can develop the required brake horsepower without strain.

To this end what I propose is a prime mover driving a variable displacement hydraulic pump and a speed-responsive signal generator, the pump being in closed circuit with at least one hydraulic motor driving at least one of the vehicle wheels. The pump displacement is actuated hydraulically under control of a computing valve, as described in my copending British Pat. application No. 29689/73, according to signals received from the prime mover signal generator and indirectly from the operator's "accelerator" pedal or lever, this accelerator demand signal being a function of the system pressure demanded yet having effect to impede opening of the computing valve whereas the speed signal has effect, conditioned by displacement feedback to induce opening of the said valve.

Conversely the accelerator demand signal has effect to induce opening of the prime-mover fuel control but in this it is impeded by the speed signal which tends to close the fuel control with assistance from a "return" spring which is compensated by a hydraulic disadvantage.

In operation, provided the pump is sized such that the torque required to drive it at maximum pressure and displacement is not less than prime mover torque corresponding to maximum power, we have a stable system, which cannot transmit any idling traction as there is no accelerator demand pressure to actuate the pump displacement control, which cannot labour at high demand and low speed since the commanding speed signal pressure despite spring assistance will be precluded by the higher demand pressure from opening the pump displacement control valve until the speed rises to give a speed signal pressure commensurate with the demand and which will not allow the prime mover to exceed maximum power revolutions as the speed-commanded increase of displacement would overpower reducing prime mover torque.

When the vehicle brake pedal is operated it has effect to obstruct actuation of the prime mover fuel control, to set the prime mover pump to maximum displacement, and, where the output driving motor is of variable displacement as is advisable for all but slow moving vehicles, directly or indirectly to set the motor displacement to a predetermined minimum, so that the prime mover is motored at a low relative speed by the momentum of the vehicle.

If, with brake pedal applied, the accelerator is pressed this will have effect to reduce pump stroke inversely to Accelerator pedal depression, and so force the prime mover to a higher relative speed of overrun retardation or "compression braking".

"Reverse" drive is most conveniently achieved by the output drive motor displacement control going over-centre to a fixed ("negative") displacement stop.

When "Neutral" is selected the prime mover pump is inhibited from any displacement, as is the output motor if applicable, so that the operator may run the prime mover freely. If the prime mover is recalcitrant in starting, the vehicle may be towed pushed or gravitated in Neutral to an appropriate speed at which the selector lever may be moved to "drive" so effecting overrunning rotation of the prime mover.

Exemplary embodiments of the invention are illustrated in the accompanying drawings, in which.

Figure 1:
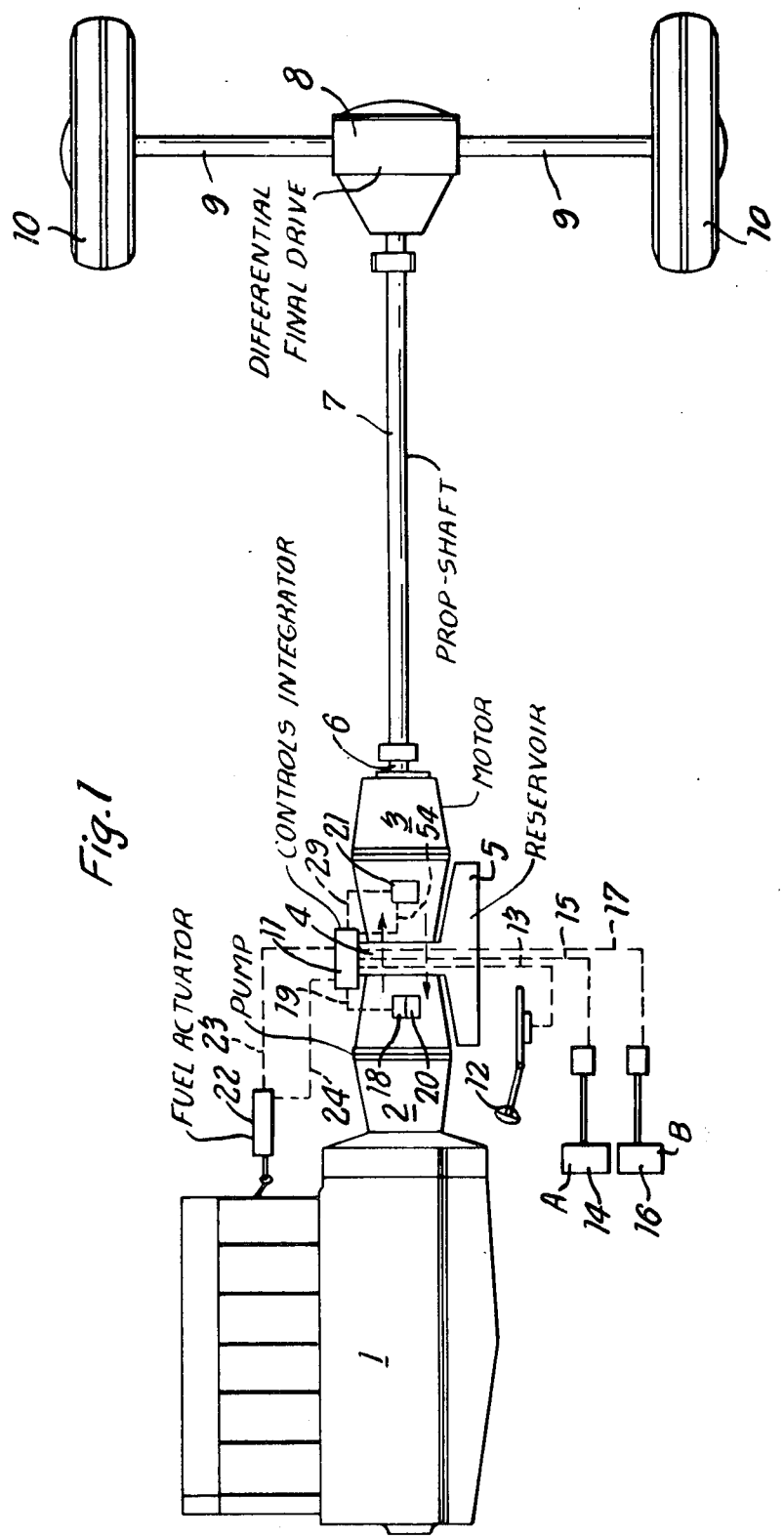
FIG. 1 is a diagrammatic representation of a prime mover transmission system applied to a vehicle with conventional differential final drive.

A prime mover and transmission system is shown in FIG. 1 in which an internal combustion engine 1 drives a variable hydraulic pump 2 associated with a variable hydraulic motor 3 through the intermediary of a manifold block 4 which itself is associated with a reservoir tank 5. The output shaft 6 of motor 3 connects via the propellor drive shaft 7, the differential final drive 8 and axle-shafts 9 to the driving wheels 10 of a vehicle which could be an automobile, truck, tractor, railed or off-road vehicle.

A controls integrator complex 11 accepts operator command signals from the transmission selector lever 12 via the signal line or link 13, from the accelerator pedal 14 via the signal line 15 and from the brake pedal 16 via the signal line 17: it also accepts an input signal from the pump-speed-signal generator 18 via the signal line 19 and a delivery pressure signal from manifold block 4. The integrator complex 11 provides output command signals to the pump computing control valve 20 as described in my copending British Pat. application No. 29689/73 and the motor computing valve 21 by internal galleries 54, 29 and to the engine fuel actuator 22 by the signal lines 23, 24 carrying respectively the power command and a speed signal modified within the integrator complex by an amplifier/attenuator as described in my copending U.K. Pat. application No. 29469/74.

Figure 2:
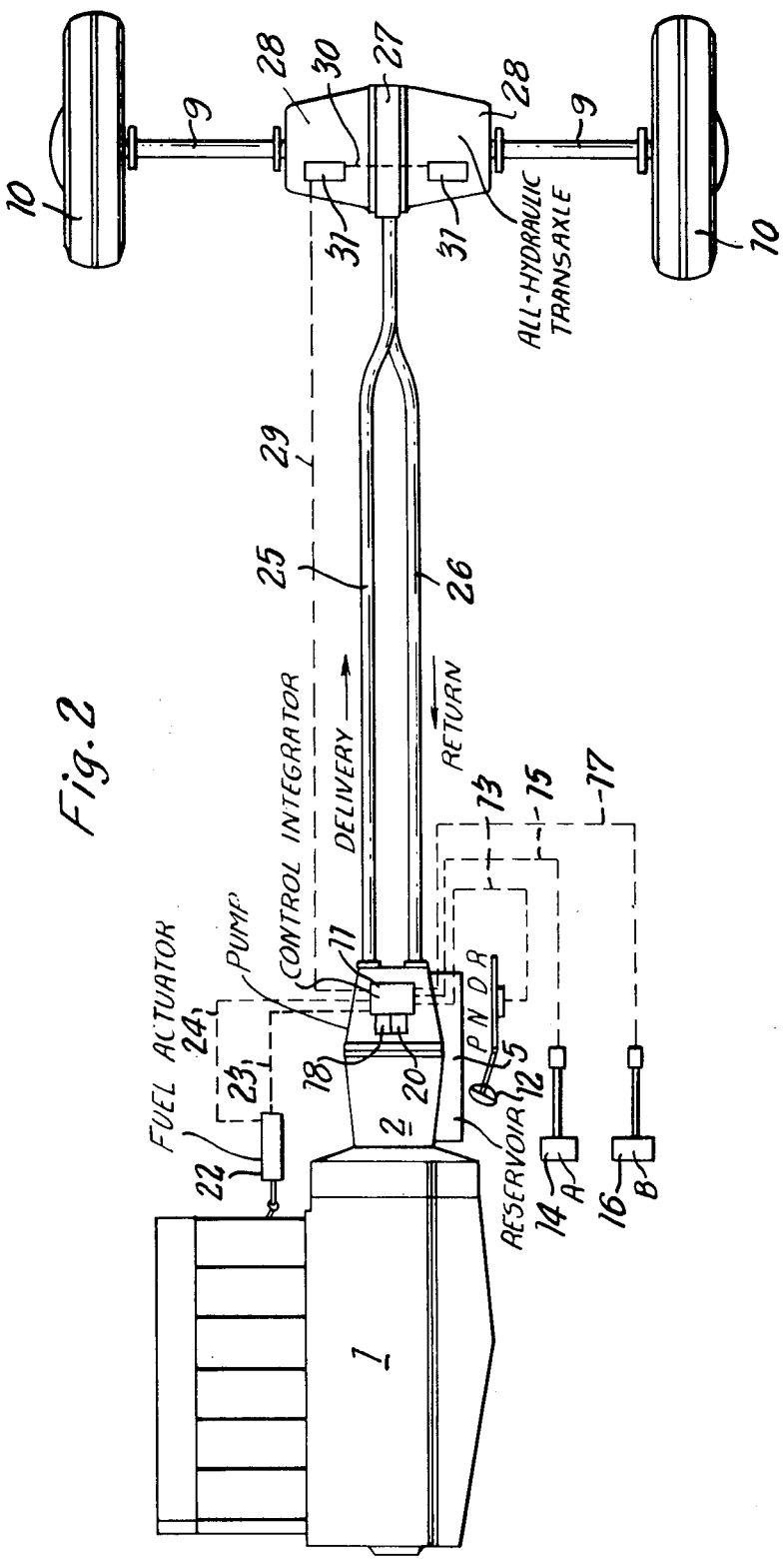
FIG. 2 is a similar representation of a vehicle having independent hydraulic motor drive to its driven wheels.

FIG. 2 shows an alternative prime mover transmission system in which the same engine 1 and pump 2 pass a flow of hydraulic prssure fluid via the delivery pipe 25 and return pipeline 26 and a branching manifold 27 to a pair of hydraulic motors 28 capable of transmitting both driving and overrunning torque to the vehicle driving wheels 10 through the axle-shafts 9. The controls integrator complex 11 receives input and transmits output signals as earlier described for FIG. 1 except that, the hydraulic motors 28 being remote, the command signal thereto must be transmitted by the external signal pipeline 29 and branch-line 30 to the motor computing valves 31.

Figure 3:
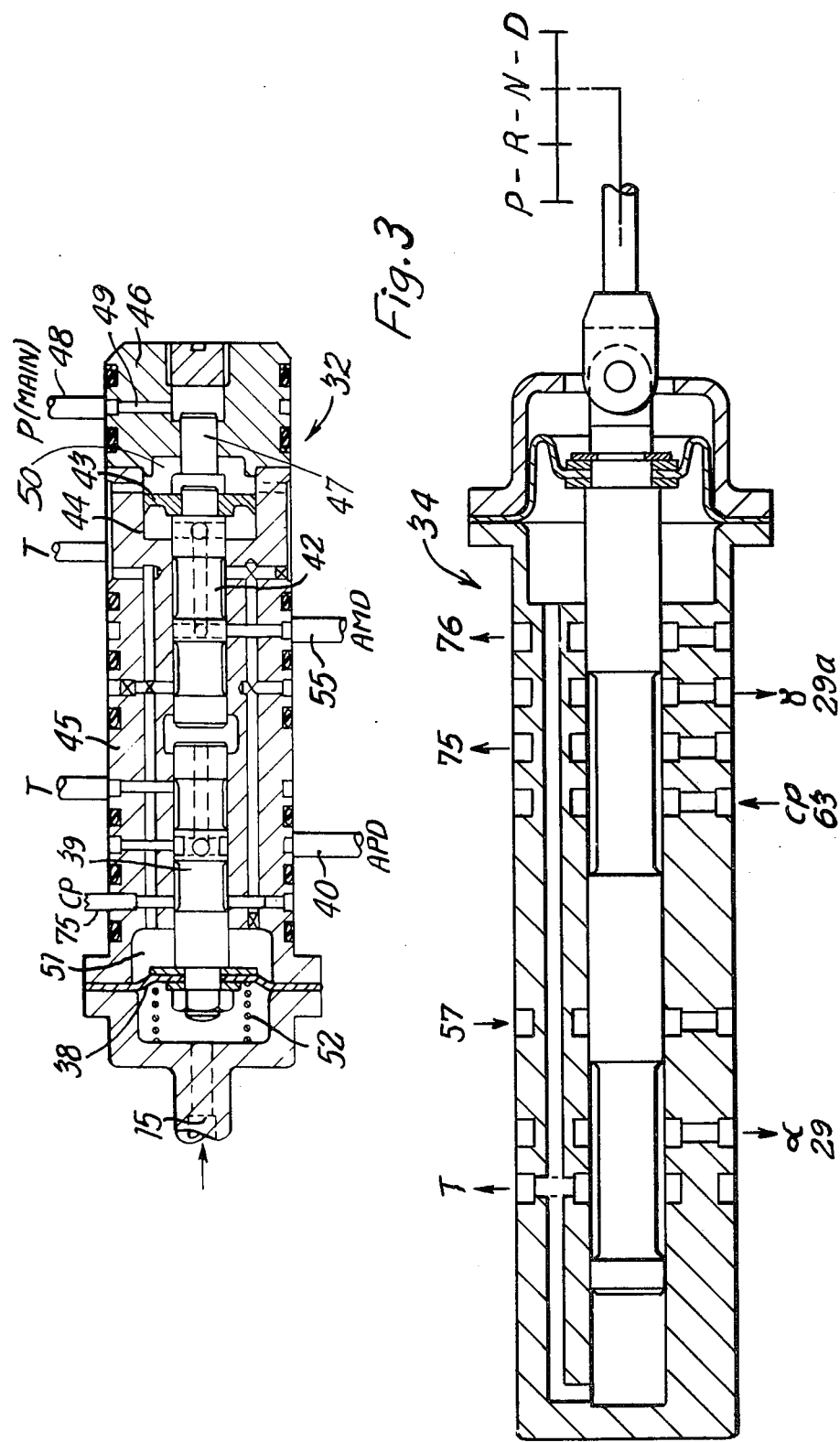
FIG. 3 shows cross-sections of an accelerator command transducer valve and a drive regime transducer valve.

FIG. 3 shows in detail two of the following elements which together comprise the operator controls integrator complex 11. Of these, the accelerator command transducer 32 performs the primary function in causing the transmission to drive the vehicle; a very similar braking transducer (not shown) controls overrunning retardation in association with the accelerator transducer 32 and a selector valve 34, according to regime selected (Drive-Neutral-Reverse-Park), directs the transducer commands to the motor computing valve or valves (21 of FIG. 1 and 31 of FIG. 2) as also a constant pressure signal from the parking valves 35 (FIG. 4) to inhibit against the motor 3, 28 going overcenter to effect reverse drive; the engine pump speed signal amplifier/attenuator 36 (FIG. 4) effectively square-roots and amplifies the pump speed signal to provide a more functionally useful and substantially linear speed signal. Finally as may be more convenient, the engine fuel actuator 22 may be incorporated in the controls integrator complex 11 with a mechanical or other single channel connection 37 to the engine carburettor or fuel injector.

Figure 4:
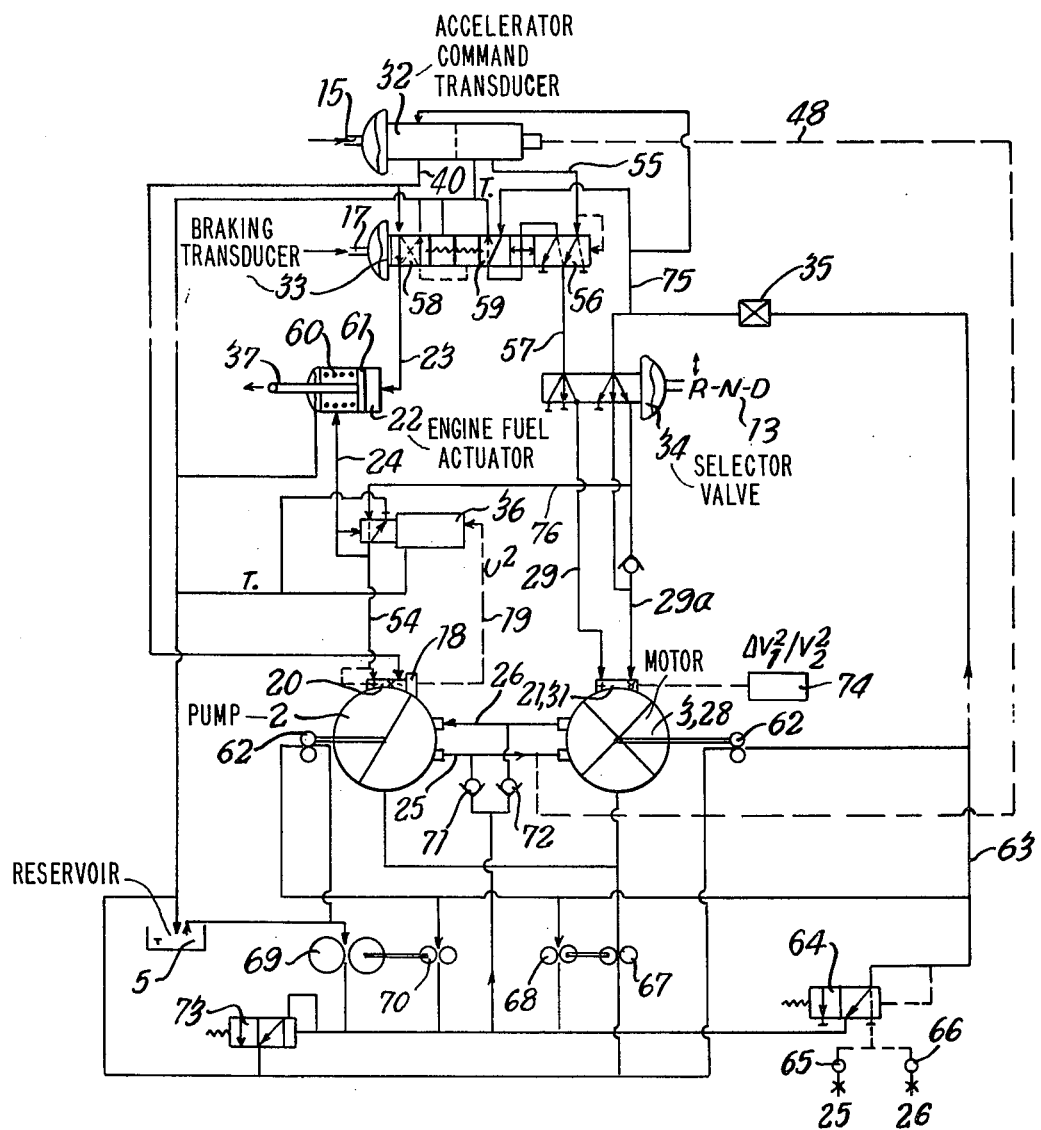
FIG. 4 shows diagrammatically an hydraulic control circuit.

FIG. 4 shows a hydraulic control circuit for the integrator complex in association with the engine pump (2) and output drive motor (3), the various elements of the complex being numbered as in FIG. 3, and the engine pump and output motor with their ancillaries and connections as in FIG. 1 and FIG. 2.

Referring jointly to FIGS. 3 and 4, the accelerator command transducer 32 receives the raw driver's command signal 15, whether this be pneumatic, hydraulic or mechanical, at the outermost face of the hermetic diaphragm 38 which may also serve as a diaphragm piston to transmit the raw input 15 at an appropriate pressure area advantage to the valve spool 39 whose output 40, amplified by a suitable constant pressure input 75, is fed-back to the opposite end of the spool 39 to balance the diaphragm input.

The same output feed-back pressure also acts on one end of a co-axial spool 42 the remote end of which is fitted with a larger diameter piston 43 closely sliding in a bore 44 in a main valve body 45 having an end cover 46 in which slides a small co-axial piston 47 subject to pressure from the pump main delivery via pipeline 48 and end-cover gallery 49. The space 50 between piston 43 and end-cover 46 is vented to tank (T & 5) together with the spill efflux from both spools 39, 42 and the space 51 between the main body 45 and the diaphragm 38 which may have a spring 52 to counter the effect of any tank pressure on the diaphragm 38.

In operation the output 40 from the primary spool 39 bears a direct amplified servo relationship to the raw input signal pressure 15, whereas the output 55 from the secondary spool 42 bears a servo attenuated relationship to the pump main delivery pressure 25, 48, 49 less a stabilizing function of the primary signal output pressure 40. This primary signal output 40 is directed firstly to the computing valve 20 of the engine driven pump 2 with effect to demand a reduction of stroke displacement, and secondly via the braking transducer 33 and line 23 to the engine fuel actuator 22 with effect to increase the feed of fuel to the engine 1 and so to increase engine speed and pump speed. The speed responsive signal ($v^2$, 19) is modified by the amplifier/attenuator 36 and passed by 24 to the engine fuel actuator 22 with effect to decrease fuel or strike a fuelling balance with the operator's primary demand 40, 23. The modified speed signal 24 is also passed by gallery 54 to computing valve 20 of engine pump 2 with effect to demand an increase of stroke displacement as the engine 2 speeds up.

This ensures that an increase of operator demand allows the engine to speed up in advance of the increase of pump load and therefore of engine mean effective pressure so that the engine cannot accelerate in labour It ensures focalized stability of instantaneous operating conditions; and by a judicious choice of design parameters it ensures that the power requirement for any instantaneous operating condition is met by the engine working at the optimum balance between maximized mean effective pressure and minimized speed of revolution. It ensures that at engine idling speed no "creep" torque will be transmitted to the vehicle wheels.

The secondary output 55 from the spool 42 of the accelerator transducer 32 passes via the shuttle valve 56 incorporated with the braking transducer 33, the gallery 57, the selector valve 34 in the Drive mode, and gallery or pipeline 29 to the computing valve 21, 31 of the drive motor 3, 28 with effect to increase the motor stroke displacement as a function of the operator's secondary command output 55 which itself is a function of the pump delivery pressure 25.

The braking transducer 33 can accept as input signal either the initial pressure via 17 from the vehicle braking system master cylinder or an electro-solenoid impulse triggered from the brake-light switch (not shown) as the first stage of the transducer 33 is a two-position four-way valve 58 which serves to direct the accelerator primary command 40 either to the engine fuel actuator 22 or, if triggered by brake-operation, to the second stage 59 of the transducer 33 where it is transformed to a pressure, close to that of the primary command 40 but in its absence to a basic pressure, which is passed to the shuttle valve 56 where, in the absence of any accelerator secondary pressure 55, it will switch the shuttle 56 and be directed via the selector valve 34 in Drive to the motor computing valve 21, 31. The effect of this is that when the operator releases his accelerator, pedal 14 the motor 3, 28 instead of returning to zero stroke-displacement, is held to a basic minimum in the overrun pumping mode so as to "motor" the pump 2 which, in the absence of operator primary command signal pressure 40, will accept the modified speed signal 36, 54 and increase stroke displacement to maximum.

If, with brake pedal 16 depressed even slightly, the accelerator pedal 14 is pressed, then increasing primary command pressure 40 will have effect to counter the modified speed signal 36, 54 in the pump computing valve 20 and progressively reduce pump displacement, and will also have effect via change-over valve 58, transformer valve 59, shuttle valve 56, selector valve 34 and motor computing valve 21, 31 to progressively increase motor displacement, the combined effect being that the motor 3, 28 is driven by vehicle momentum to act as a pump forcing fluid at an increasing hydraulic disadvantage to the engine driven pump 2 which, acting as a motor, is forced to progressively increasing relative overrunning speeds, as is the engine 1 with it, subject only to the fact that the computing valve 20 differentiating between the command and speed signals will not allow an overrunning pump (and engine) speed in excess of the programmed maximum.

For reverse driving, the selector valve 34 interrupts and drains both the signal lines 29, 29a to the computing valve 21, 31 of the motor 3, 28 which in the absence of any control will be forced over-center to the limit by the delivery pressure 25 arriving from the pump 2 under command from the operator primary signal 40, 33, 23, fuel actuator 22, modified speed signal 19, 36, 54 and computing valve 20.

The fuel actuator 22 may be fitted with a spring 60 abutting the double-acting piston 61 with effect to vary the optimized engine m.e.p./speed characteristic as programmed, in the light of specific choice or requirement.

The engine pump 2 and motor 3, 28 each have a miniscule gear pump 62 to provide control pressure 63 maintained constant by the relief valve 64 which, in the case of under-pressure due to excess demand, will return the main pump delivery pressure 25 or return pressure 26 via ball checks 65, 66.

As the motor 3, 28 and even more particularly the pump 2 will run more efficiently with their interior "dry" rather than flooded with oil, it is advantageous in some applications to provide a scavenge pump 67 conveniently driven by a gear-motor 68. Similarly, to accommodate for pumping volumetric losses, a make-up pump 69 conveniently driven by a gear-motor 70 supplies any loss requirement to the main delivery 25 or return 26, whichever is at low pressure, via the ball-checks 71, 72 and at a pressure maintained constant by the relief-valve 73.

The wheel driving motor 3 or motors 28 may each incorporate or have associated therewith a differential speed signal piloted actuator spill control valve 74 as described in my copending U.K. Pat. application No. 34907/73 as a means of controlling drive wheel slip.

I claim:

1. In a vehicle drive system, in combination, a variable displacement type pump which pumps fluid at a pump delivery pressure, a fuel driven engine for driving said pump, a load-driving variable displacement type hydraulic motor driven by said fluid at said pump delivery pressure, and a control system including an accelerator for said engine, accelerator signal producing means for producing an accelerator signal as a function of accelerator command, pump speed signal producing means for producing a pump speed signal as a function of pump speed, fuel supply means responsive to said accelerator signal to increase the supply of fuel to said engine as a function of said accelerator signal and responsive to said pump speed signal to decrease the supply of fuel to said engine as a function of said pump speed signal, means responsive to said accelerator signal for reducing the displacement of said pump as a function of said accelerator signal, motor displacement signal producing means responsive to said accelerator signal and to pump delivery pressure for producing a motor displacement signal as a function thereof, and means for increasing motor displacement as a function of said motor displacement signal.

* * * * *

UNITED STATES PATENT OFFICE
CERTIFICATE OF CORRECTION

Patent No. 3,932,991              Dated      Jan. 20, 1976

Inventor(s) ROBERT CECIL CLERK

It is certified that error appears in the above-identified patent and that said Letters Patent are hereby corrected as shown below:

In the ABSTRACT, line 9, after "pump" add -- and pressure --.

Column 1, line 37, the word "British" should read -- U.S. --;

line 38, the words "No. 29689/73" should read -- Serial No. 482,259 --.

Column 2, line 57, the word "British" should read -- U.S. --;

line 58, the words "No. 29689/73" should read -- -- Serial No. 482,259 --.

Column 6, line 18 of Claim 1, after "signal" add -- and responsive to said pump speed signal for increasing the displacement of said pump.

Signed and Sealed this

Sixth Day of July 1976

[SEAL]

Attest:

RUTH C. MASON
*Attesting Officer*

C. MARSHALL DANN
*Commissioner of Patents and Trademarks*